United States Patent

Meritzis

[11] 3,979,135
[45] Sept. 7, 1976

[54] VEHICLE PROPELLED BY RECIPROCATING OCCUPANT MOTION

[76] Inventor: Athanassios N. Meritzis, 666 Coronado Ave., Long Beach, Calif. 90814

[22] Filed: Jan. 21, 1974

[21] Appl. No.: 434,796

[52] U.S. Cl. .......................................... 280/226 R
[51] Int. Cl.² ......................................... B62M 1/18
[58] Field of Search ............................... 280/226 R

[56] References Cited
UNITED STATES PATENTS

| | | | |
|---|---|---|---|
| 529,717 | 11/1894 | Deacon | 280/226 R |
| 634,192 | 10/1899 | Vaughn | 280/226 R |
| 1,273,079 | 7/1918 | Matson | 280/226 R |
| 1,339,624 | 5/1920 | Hintz | 280/226 R |
| 3,666,291 | 5/1972 | Ortiz | 280/226 R |

FOREIGN PATENTS OR APPLICATIONS

| | | | |
|---|---|---|---|
| 912,078 | 7/1946 | France | 280/226 R |
| 917,929 | 1/1947 | France | 280/226 R |
| 15,601 | 7/1896 | United Kingdom | 280/226 R |

*Primary Examiner*—M. H. Wood, Jr.
*Assistant Examiner*—Terrance L. Siemens

[57] ABSTRACT

A practical vehicle for riding propelled by reciprocating occupant motion comprising a sliding seat on rails mounted on a vehicle frame in which frame three or four wheels are rotatively mounted. The mechanism comprises a chain attached by its two ends to the movable seat and which chain transmits the reciprocating motion through loose sprockets to two freewheels mounted on separate and parallel axles on bearings. On the same axles a pair of intermeshed spurgears are driven in each back and forth motion of the chain by one of the two freewheels, the one locked on its axle which is the driving element. The second spurgear is following freely the motion of the first, and vice versa. The combination of both the freewheels and the intermeshed spurgears alters the reciprocating motion to a continuous and single direction motion of the chainwheel which is attached to the extension of one of the two parallel axles. The chainwheel with a separate chain gives through the shaft supporting the rear wheels the forward propulsion to the vehicle.

2 Claims, 4 Drawing Figures

VEHICLE PROPELLED BY RECIPROCATING OCCUPANT MOTION

The present invention contemplates certain new and useful improvements in vehicles propelled by the rider's own muscular force and more particularly, the invention contemplates the rider's relief from an extreme fatigue in his effort to reach long distances or high speeds. The following is a full, clear and exact description.

The invention relates to a vehicle of velocipede type having, as a system of propulsion, the reciprocating motion of the rider's own body and legs in place of the lever system operated by the feet and used in the pedaling process of driving.

The new system of propulsion of the present invention is based on the simultaneous action of both legs in combination with the seat sliding back and forth on curved rails as well as the force of gravity of the rider's body for assisting in the propulsion of the vehicle.

The invention furthermore, contemplates the various structural arrangements of the mounting and support of the mechanism which will appear fully from the following description taken together with the accompanying drawing wherein.

DESCRIPTION

Figure 1:
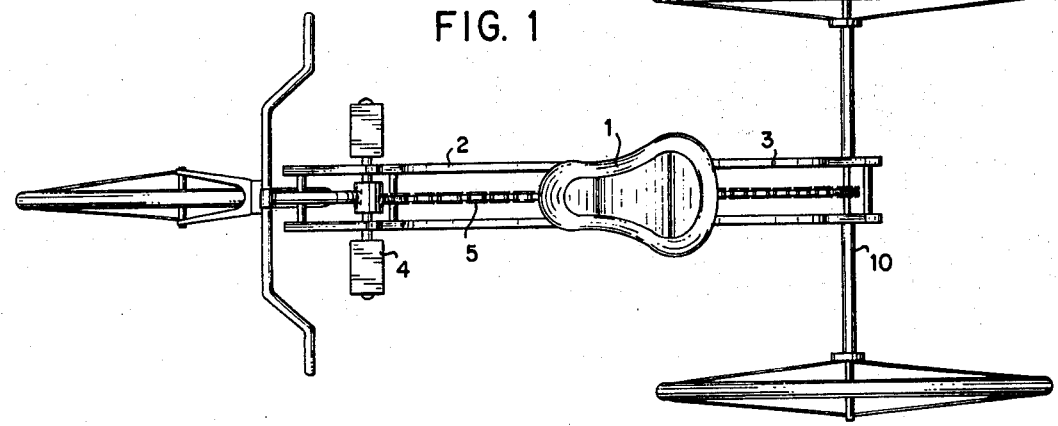
FIG. 1 Is a top view of the vehicle of a tricycle type.

Referring now to the FIGS. 1, 2, 3, and 4, it will be seen that the process of operation is as follows:

The rider sits on the movable seat 1 sliding on rails 2 placed on top of the vertical surfaces or frames which are part of the vehicle's body 3. With the feet on fixed supports 4 he moves his body and legs alternately back and forth. The rails on which the seat is sliding are of a curved shape. This shape gives the rider's body the force of gravity necessary especially in the forward movement when the legs are almost out of action. The sliding seat is attached to the ends of a chain 5 which chain passes over loose sprockets or pulleys and leads to a sprocket wheel 6 which is fixed on an axle on bearings. On the same axle a second sprocket transmits the back and forth motion with a second chain to two freewheels 7 set on parallel axles on bearings.

The freewheels are arranged in such a way that, when one is disengaged from its axle and revolves loose and free, the other is locked on its own axle and turns it, and vice versa. On the same axle, a pair of spurgears 8 driven by the freewheels controls in a continuous and single direction, the revolution of a chainwheel 9 fixed on the extension of one of the two axles. This chainwheel, with a third chain, in its turn, transmits the continuous and single direction motion to the main shaft 10 supporting the wheels of the vehicle.

Figure 2:
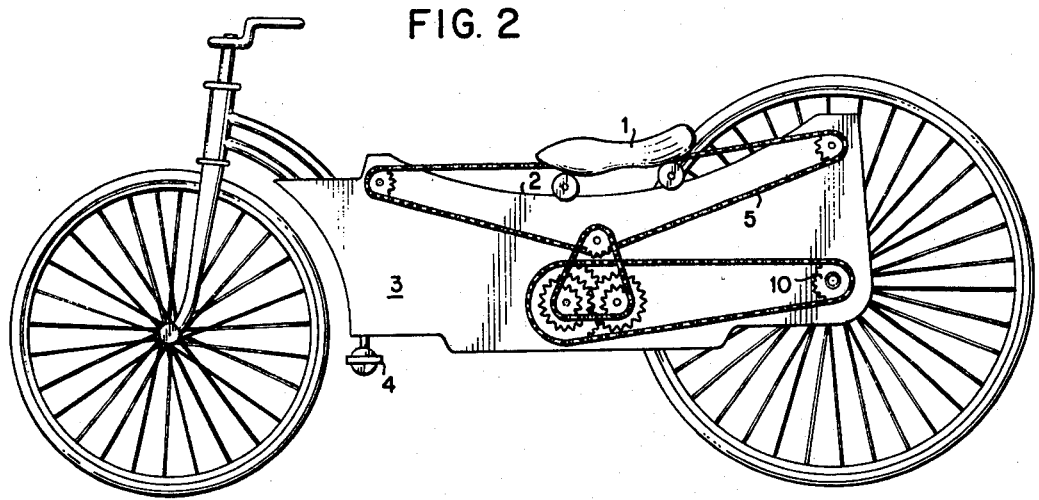
FIG. 2 Is a side elevation of the vehicle in FIG. 1, showing through the structure, the arrangement of the driving mechanism.
Figure 3:
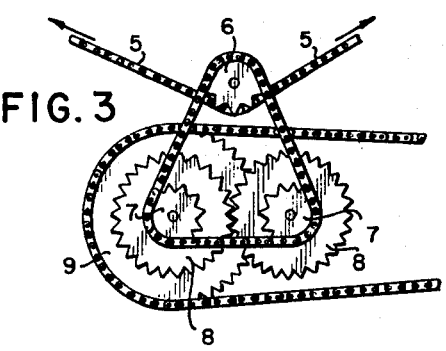
FIG. 3 Is an enlarged fragmentary section of the mechanism in FIG. 2.
Figure 4:
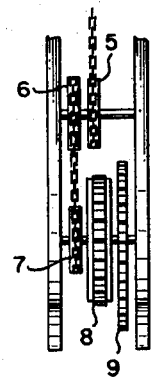
FIG. 4 Is a vertical side view of FIG. 3.

More precisely, the drive elements of the mechanism during a full cycle of operation cooperate as follows:

In accordance with the drawing FIG. 2 and FIG. 3, the chainwheel which transmits the movement with a separate chain to the shaft supporting the rear wheels of the vehicle is mounted on the first of the two parallel axles (left part of the drawing). Therefore the spurgear mounted on the same axle should always turn counter clockwise when the second spurgear meshed with it should turn clockwise.

a. When the seat slides forward, the driving element is the freewheel set and locked on the first axle. This freewheel turns both the spurgear and the chainwheel mounted on the same axle. The second freewheel is freewheeling, leaving its spurgear free to follow the motion of the first.

b. When the seat slides rearward, the driving element is the second freewheel which in its turn is locked on its axle and turns clockwise the spurgear mounted on the same axle. This spurgear transmits the motion to the first one which, together with the chainwheel attached to the same axle, turns in the opposite direction which is the proper one for the forward motion of the vehicle.

The whole system of driving of the invention is based on the following principles:

1. A higher active force.

The use of the simultaneous action of both legs in combination with the sliding seat on curved rails as well as the force of gravity used in part with the arms as an auxiliary pulling and pushing on the handlebars, is a more powerful and effective method of propulsion than the pedaling system of rotation.

2. A higher velocity.

In a full cycle of operation we have, with the full distance covered by the back and forth movements of the sliding seat, a greater distance covered by the chain attached to it than the one covered by a full pedal cycle movement needed for a common bicycle. So to get the same chain distance in the common pedalling system we have to make more movements or replace the chainwheel with a larger one which would require more power from the rider. Therefore the reciprocating motion of the new system results in an increased speed or the reduction of the movements of the rider.

The result obtained from this new method of propulsion is the minimization of the rider's effort and as a result the gain of a larger margin of endurance to overcome the problem of fatigue.

It is to be understood that the above describes embodiment of the invention is for the purpose of illustration only and various changes may be made therein without departing from the spirit and scope of the invention.

I claim:

1. A vehicle comprising a frame supported by wheels rotatively mounted with a movable seat sliding on the curved rails of the said frame and adapted to be reciprocated by the rider's force and a motion transmission mechanism comprising:
    a. A pair of freewheels mounted on separate and parallel shafts on bearings and turning with a chain attached by its two ends to the sliding seat.
    b. A pair of intermeshed spurgears attached to the same shafts with the freewheels such that, in combination, a forward propulsion may be achieved by both forward and reverse occupant motion.
    c. A chainwheel attached to the extension of one of the two shafts supporting the freewheels and the spurgears which transmits the motion with another chain to the rear wheels supporting the vehicle.
    d. A plurality of loose and fixed sprockets used for directing the motion of the chains and for turning the different shafts of the mechanism.

2. A vehicle according to claim 1 wherein the curvature of the rails near the rear portion such that gravity tends to assist the forward motion when the legs are ineffective in producing propulsion.

* * * * *